United States Patent
Hayashi et al.

(10) Patent No.: US 6,744,419 B1
(45) Date of Patent: Jun. 1, 2004

(54) MONITOR FOR DISPLAY RE-IMAGING AND DISPLAY RE-IMAGING SYSTEM

(75) Inventors: Toshinari Hayashi, Tokyo (JP); Takahiro Kaneko, Yokohama (JP)

(73) Assignees: Tokyo Broadcasting System, Inc., Tokyo (JP); NEC-Mitsubishi Electric Visual Systems Corporation, Tokyo (JP)

( * ) Notice: Subject to any disclaimer, the term of this patent is extended or adjusted under 35 U.S.C. 154(b) by 181 days.

(21) Appl. No.: 09/762,717

(22) PCT Filed: Sep. 29, 2000

(86) PCT No.: PCT/JP00/06782
§ 371 (c)(1),
(2), (4) Date: Feb. 12, 2001

(87) PCT Pub. No.: WO01/24144
PCT Pub. Date: Apr. 5, 2001

(30) Foreign Application Priority Data

Sep. 30, 1999 (JP) .................................. 11-278826

(51) Int. Cl.⁷ ................................................ G09G 3/36
(52) U.S. Cl. .................... 345/102; 345/88; 345/690
(58) Field of Search ................... 345/102, 87, 88, 345/89, 690; 349/61

(56) References Cited

U.S. PATENT DOCUMENTS 6,243,068 B1 * 6/2001 Evanicky et al. ........... 345/102

FOREIGN PATENT DOCUMENTS

| JP | 4-263591 | 9/1992 |
| JP | 7-303649 | 11/1995 |
| JP | 9-113871 | 5/1997 |
| JP | 11-14978 | 1/1999 |

\* cited by examiner

Primary Examiner—Dennis-Doon Chow
(74) Attorney, Agent, or Firm—Westerman, Hattori, Daniels & Adrian, LLP

(57) ABSTRACT

The display re-imaging system comprises a monitor (1) for display re-imaging and a television camera (30) having a display of the monitor for display re-imaging in a part of a field of view of the television camera. The monitor (1) consists of an LCD monitor comprising a back light (11) including cold cathode fluorescent lamps (11-1 to 11-4) as a light source having a prescribed color temperature, and a non-self-light-emitting-display panel (13) for selectively transmitting light emitted from the back light according to an image signal. The, color temperature of the cold cathode fluorescent lamps (11-1 to 11-4) is adjusted to a level corresponding to a reddish color to match with the color temperature of the re-imaging environment. According to such a monitor (1) for display re-imaging and a display re-imaging system, because the color temperature correction is performed on the back light itself, there is no problem of reduced brightness as was the case with the conventional RGB and filter adjustment methods that were used in connection with the conventional monitors for display re-imaging and display re-imaging systems using LCD panels. As a result, the monitor has a thin profile, consumes little power, and provides a bright display as compared to the conventional CRT display.

10 Claims, 6 Drawing Sheets

MONITOR FOR DISPLAY RE-IMAGING AND DISPLAY RE-IMAGING SYSTEM

TECHNICAL FIELD

The present invention relates to a monitor for display re-imaging using a non-self-light-emitting display panel such as a LCD panel, and a display re-imaging system using such a monitor for display re-imaging.

BACKGROUND OF THE INVENTION

Placing monitors in a TV studio set, and shooting a scene of the television studio including the displays of the monitors by using a television camera is becoming increasingly common in recent years. Shooting a scene containing the displays of monitors by using a television camera is called as "display re-imaging", and a display monitor that is used for such a purpose is called as a "monitor for display re-imaging".

When such a re-imaging technique is used, for instance, in an election news broadcast program, the appeal of the program to the viewers may be increased by placing a large number of monitors in the studio to show the state of ballots of each election district on each monitor, and allow the newscaster to make comments to it in the studio.

When a commercially available ordinary monitor is placed in a television studio, and it is shot with a television camera, although the display of the monitor in the studio may look normal to human eyes, it is known that the display of the monitor as re-imaged by the television camera may look too pale and unnatural to be acceptable.

This is due to the fact that the color temperature of the monitor display is higher than the color temperature of the studio. More specifically, when the monitor display is viewed by human eyes, the image stimulus sensed by the human retina is automatically and physiologically color adjusted by the human brain so that the monitor display would not create any unnatural impression although the color temperature of the monitor display may be different from that of the studio. However, a television camera is incapable of any such automatic color adjustment unlike a human brain, and the monitor display as re-imaged by the television camera looks pale and unnatural if the color temperature of the monitor display is higher than that of the studio.

Therefore, conventionally, the monitors for display re-imaging that are used in a television studio are adjusted of their color temperature in the range of 3,000 K (Kelvin) to 3,400 K so as to match with that of the studio.

Conventionally, monitors for display re-imaging typically consisted of CRT monitors, and the color adjustment of such a CRT monitor for display re-imaging was typically accomplished by readjusting the RGB gain of the driver circuit in the stage immediately preceding the CRT. The color temperature of the CRT is lowered so as to match with the color temperature of the studio.

The CRT monitors that are currently on the market are oftentimes adjusted to have color temperatures in the range of 9,000 K to 10,000 K. In the past, the amount of color adjustment that was required to make such CRT monitors usable for display re-imaging was so great that the brightness of the monitor display had to be sacrificed.

However, the recent development in the fluorescent material and the structure of the CRT has made it possible to ensure an adequate display brightness even when the color adjustment is effected to such an extent. Therefore, the aforementioned problems can be solved by placing a simple color corrector externally of the CRT to effect the color adjustment instead of adjusting the RGB gain of the stage preceding the CRT.

It is now being contemplated to use LCDs for monitors for display re-imaging in television studios, instead of the more conventional CRT displays.

The LCD monitor has the following advantages:
1) a thin profile;
2) high image resolution;
3) less flicker when displaying computer images owing to the afterglow; and
4) low power consumption.

It also has disadvantages such as:
1) difficulty in manufacturing large displays;
2) lack of adequate brightness;
3) limited contrast;
4) narrow view angle;
5) more pronounced afterglow than CRT display;
6) shorter service life; and
7) higher cost than CRT display.

In particular, the LCD monitor has been considered as unsuitable for display re-imaging because of:
1) difficulty in manufacturing large displays;
2) lack of adequate brightness;
3) limited contrast; and
4) narrow view angle.

However, the recent advance in the LCD technology has been such that the above listed disadvantages have been significantly improved. Therefore, attempts have been made to use LCDs as monitors for display re-imaging in television studios.

The methods for adjusting the color temperature of an LCD monitor when it is used as a monitor for display re-imaging include the following:
1) controlling the RGB gain by adjusting an image signal level (RGB adjustment method); and
2) placing an optical filter in front of the LCD monitor for color adjustment (filter adjustment method).

However, either one of the adjustment methods, the RGB adjustment method or the filter adjustment method, significantly reduces the brightness of the display after the color adjustment.

In other words, as was the case with the CRT monitor, it is possible to color adjust the LCD monitor by adjusting the image signal, but the brightness of the G and B components have to be reduced for the desired color adjustment, and this inevitably reduces the overall brightness. In the case of the CRT monitor, the overall brightness can be increased after the color temperature correction to achieve a desired balance. However, because the LCD monitor has a lower brightness saturation point as compared with a CRT monitor, it is not possible to ensure an adequate brightness after the color temperature correction even when the overall brightness is increased to the maximum possible level.

The color temperature correction using an optical filter also reduces the overall brightness because the color temperature is lowered by reducing the brightness of the G and B component, and the same problem exists.

The present invention was made in view of such problems, and its primary object is to provide a monitor for display re-imaging which has a thin profile, consumes little power, and provides a bright display as compared with a CRT monitor, and a display re-imaging system using such a monitor.

Another object of the present invention is to provide a monitor for display re-imaging which has a thin profile and a high image resolution power, is free from flicker due to the high degree of afterglow when displaying a computer image, and consumes little power while ensuring a highly bright display, as well as a display re-imaging system using such a monitor.

Other objects and advantages of the present invention will become apparent to a person skilled in the art by referring to the following description.

BRIEF SUMMARY OF THE INVENTION

The monitor for display re-imaging of the present invention comprises a back light having a prescribed light source; and a non-self-light-emitting display panel which selectively transmits the light of the back light according an image signal.

Additionally, the color temperature of the light source forming the back light is adjusted to match the surrounding color temperature.

The display re-imaging system of the present invention comprises a monitor for display re-imaging, and a video camera which covers the display of the monitor for display re-imaging in a part of its field of view. The video camera may include a television camera.

The monitor for display re-imaging comprises a back light having an light source which is appropriately color temperature adjusted, and a non-self-light-emitting display panel which selectively transmits the light of the back light according an image signal.

Additionally, the color temperature of the light source forming the back light is adjusted to match the color temperature of the surrounding environment. The surrounding environment includes television and video studios with various fixtures.

According to the monitor for display re-imaging and the display re-imaging system, because the color temperature adjustment is made on the back light itself, there is no problem of reducing the brightness due to the use of the RGB adjustment method or the filter adjustment method as was the case with the monitor for display re-imaging and display re-imaging system using the conventional LCD monitor. Therefore, the present invention provided a monitor for display re-imaging which has a thin profile, consumes little power, and provides a bright display as compared with a CRT monitor, and a display re-imaging system using such a monitor.

The monitor for display re-imaging and display re-imaging system of the present invention can be implemented in various manners.

The "non-self-light-emitting display panel" means a display panel which displays an image by selectively transmitting light from a back light instead of emitting light by itself.

The "re-imaging environment" means the environment in which the monitor in question is placed, and the re-imaging takes place. More specifically, such re-imaging environments include television studios and videos studios.

The "color temperature of the "re-imaging environment" may vary depending on the re-imaging environment, but preferably consists of a reddish color temperature if the surrounding environment consists of a television or video studio.

The "non-self-light-emitting display panel" as used in the present application includes those used in LCD monitors and LCD projectors.

The "back light" as used in the present application comprises cold cathode fluorescent lamps.

The "non-self-light-emitting display panel" as used in the present application may include a reflective polarizing film placed in front of the back light. This increases the brightness of the monitor display.

DETAILED DESCRIPTION OF THE PREFERRED EMBODIMENTS

Now an embodiment of the monitor for display re-imaging and an embodiment of the display re-imaging system both according to the present invention are described in the following with reference to the appended drawings.

As mentioned earlier, the monitor for display re-imaging according to the present invention comprises a back light having a prescribed light source, and a non-self-light-emitting display panel which selectively transmits light from the back light according to an image signal. Additionally, the color temperature of the light source forming the back light is adjusted so as to match the color temperature of the re-imaging environment.

Figure 1:
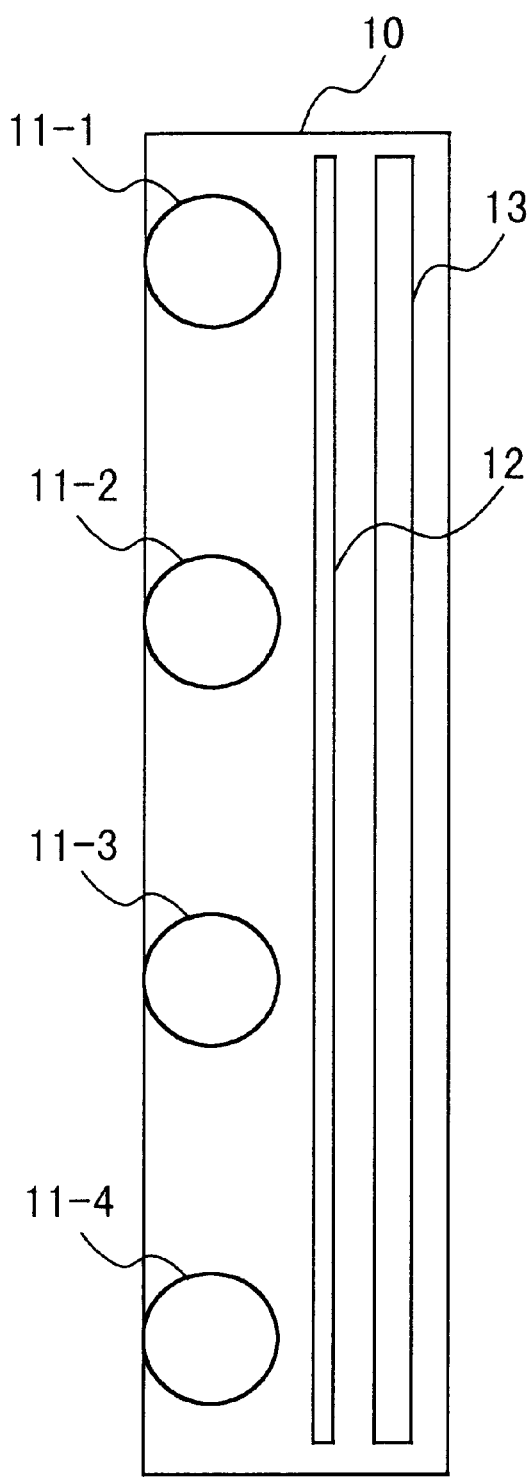
FIG. 1 is a side view showing a monitor for display re-imaging embodying the present invention.

FIG. 1 is a schematic side view showing a monitor for display re-imaging embodying the present invention. In this embodiment, the non-self-light-emitting display panel consists of an LCD panel. The light source of the back light consists of cold cathode fluorescent lamps. This monitor 1 for display re-imaging is designed for display re-imaging in a television studio.

Referring to this drawing, this monitor 1 for display re-imaging consists of an LCD monitor 10 comprising a back light 11 consisting of cold cathode fluorescent lamps 11-1 to 11-4, and a LCD panel 13 for selectively transmitting the light from the back light 11 according to an image signal. The surface of the LCD panel 13 shows a color image resulting from the selective transmission of the light from the back light according to the image signal.

The color temperature of the cold cathode fluorescent lamps 11-1 to 11-4 is selected at a somewhat reddish level so as to match the color temperature of the re-imaging environment consisting of a television studio.

In other words, whereas the color temperature of a television studio is typically in the range of 3,000 to 3,400 K, the color temperature of a typical commercially available LCD monitor is substantially higher than the color temperature of a television studio which is typically in the range of 3,000 to 3,400 K. Therefore, if a commercially available LCD monitor were used as a monitor for display re-imaging as it is, the display of the monitor for display re-imaging captured in the field of view of the television camera would appear too pale and unnatural to be acceptable.

Therefore, according to this embodiment, the cold cathode fluorescent lamps 11-1 to 11-4 that are used as the back light for this LCD monitor 10 are selected from those having a color temperature that matches the color temperature of the re-imaging environment or that of the TV studio (or that having a reddish color).

The structure and operation of a cold cathode fluorescent lamp are described in the following to aid the understanding of the method for adjusting the color temperature of the cold cathode fluorescent lamps. The cold cathode fluorescent lamps 11-1 to 11-4 are each formed by depositing a fluorescent layer on the inner surface of a glass tube filled with a small amount of mercury and inert gas (such as argon, neon and a mixture of these), and provided a columnar electrode at each end of the glass tube.

The mechanism of generating light in the cold cathode fluorescent lamps 11-1 to 11-4 is described in the following. When a high voltage is applied to the electrodes, a small amount of electrons that exist within the glass tube are drawn toward the electrodes, and collide with them at high speed. This causes secondary electrons to be emitted from the electrodes, and an electric discharge is established between the electrodes. During this discharge process, the electrons which are drawn toward the anode collide with mercury molecules within the glass tube, and this generates ultraviolet light (253.7 nm). This ultraviolet light excites the fluorescent layer into generating visible light.

The color temperature of the cold cathode fluorescent lamps 11-1 to 11-4 is determined by the selection of the material of the fluorescent layer that is deposited on the inner surface of each glass tube. In this embodiment, by appropriately selecting the material of the fluorescent layer deposited on the inner surface of the glass tubes of the cold cathode fluorescent lamps 11-1 to 11-4, the color temperature of the cold cathode fluorescent lamps 11-1 to 11-4 is matched with the color temperature of the studio.

According to this arrangement, it is possible to match the color temperature of the LCD monitor 10 with that of the re-imaging environment without reducing the brightness of the LCD monitor 10. The color temperature that matches that of the re-imaging environment preferably consists of a level corresponding to a reddish color in the case of a television studio.

In this LCD monitor 10 according to the present invention, to the end of increasing the brightness of the display of the LCD monitor 10, a reflective polarizing film 12 serving as brightness adjusting means is placed in front of the cold cathode fluorescent lamps 11-1 to 11-4 serving as the back light or between the LCD panel 13 and a diffusion sheet not shown in the drawing.

This reflective polarizing film 12 can increase the brightness of the LCD monitor 10 while retaining the view angle. The reflective polarizing film 12 may consist of "Optical Film DBEF" which is sold by Sumitomo 3 M KK. It was confirmed that the brightness of the LCD monitor 10 can be increased by 60% by using this reflective polarizing film 12.

The LCD monitor 10 forming the monitor 1 for display re-imaging illustrated in FIG. 1 can be given with a color temperature which matches with the surrounding color temperature without reducing the brightness of the LCD monitor 10 by using the following two methods.

1) The color temperature of the cold cathode fluorescent lamps 11-1 to 11-4 is adjusted according to the surrounding temperature of the studio by appropriately selecting the material of the fluorescent layer which is deposited on the inner surfaces of the glass tubes of the cold cathode fluorescent lamps 11-1 to 11-4 serving as the back light 11.

2) A reflective polarizing film 12 serving as the brightness adjusting means is placed in front of the cold cathode fluorescent lamps 11-1 to 11-4 serving as the back light.

The reflective polarizing film 12 was placed in front of the cold cathode fluorescent lamps 11-1 to 11-4 serving as the back light in the above described embodiment, but the reflective polarizing film 12 is not essential for the present invention, and may be omitted if the property of the LCD monitor 10 is improved enough to provide an adequate brightness.

Figure 2:
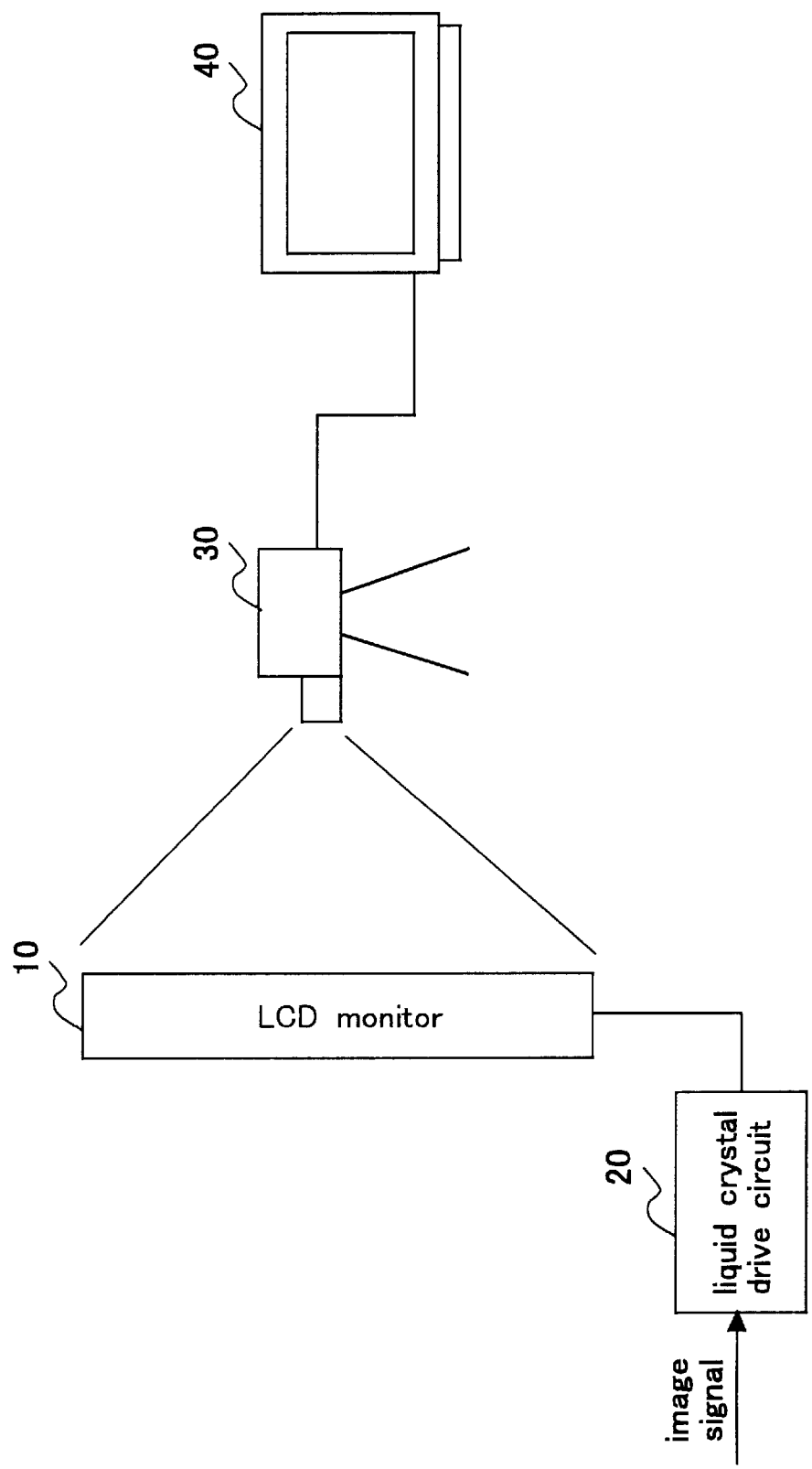
FIG. 2 is a block diagram showing a display re-imaging system embodying the present invention using the monitor for display re-imaging shown in FIG. 1.

FIG. 2 is a block diagram of a display re-imaging system embodying the present invention using the monitor for display re-imaging illustrated in FIG. 1.

Referring to FIG. 2, the LCD monitor 10 is identical to the LCD monitor 10 illustrated in FIG. 1, and is placed, for instance, in a television program studio set. A desired image signal is supplied to the LCD monitor 10 via a LCD driver circuit 20, and an image corresponding to the image signal forwarded to the LCD driver circuit 20 is displayed on the LCD monitor 10.

The image displayed on the LCD monitor 10, as well as the LCD monitor 10 itself, is re-imaged by a television camera 30. The display of the LCD monitor 10 is therefore included in the field of view of the television camera 30.

A television set 40 is connected to the television camera 30 for monitoring the image which is captured by the television camera 30.

As mentioned earlier, the color temperature of the LCD monitor 10 is adjusted to the color temperature of the studio in which the LCD monitor 10 is placed or the color temperature of the re-imaging environment.

Therefore, the part of the image captured by the television camera 30 which corresponds to the image displayed on the LCD monitor 10 would not look pale, and the color temperature adjustment of the LCD monitor 10 would not reduce the brightness of the LCD monitor 10 so that the image displayed on the television set 40 which includes the image displayed on the LCD monitor 10 looks bright and natural without becoming pale owing to the matched color temperature.

Figure 3:
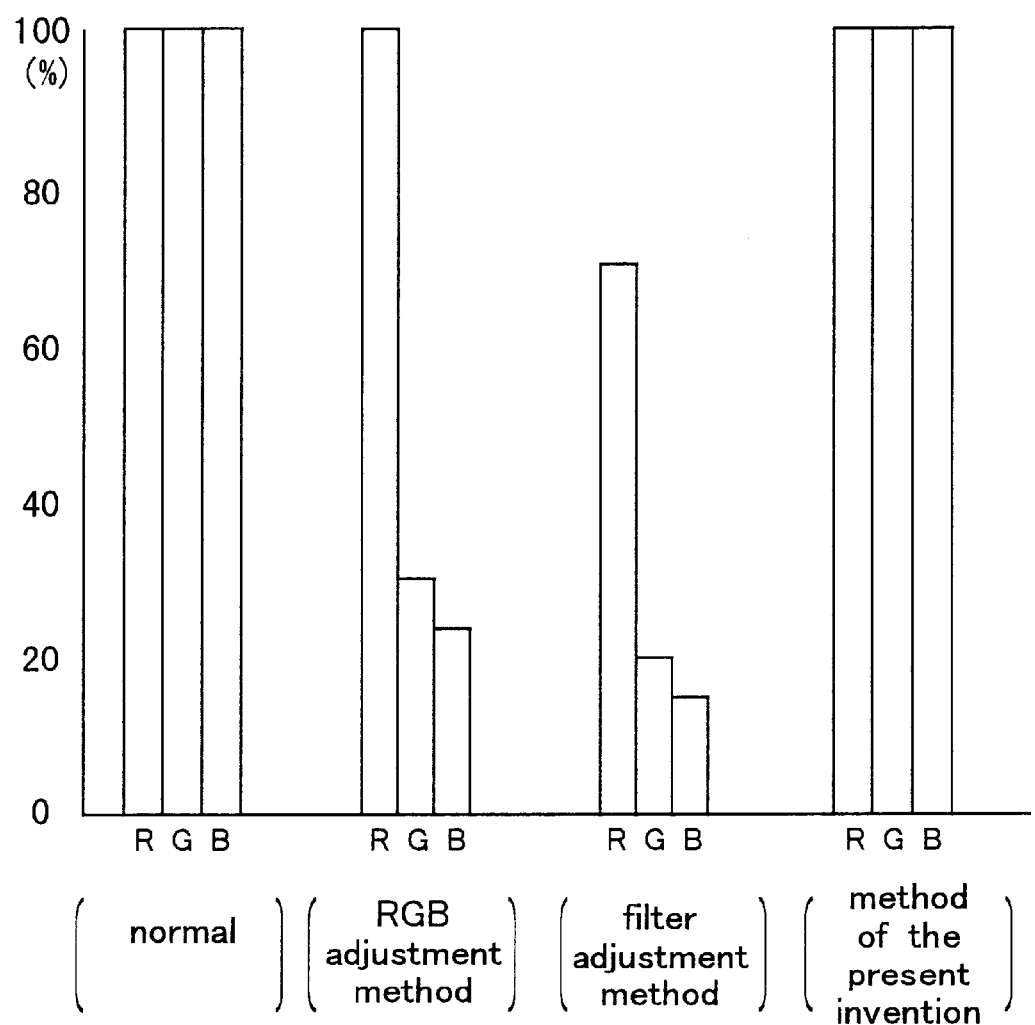
FIG. 3 is a diagram showing the principle of color temperature correction without reducing the brightness in the re-imaging system according to the present invention shown in FIG. 2.

FIG. 3 is a diagram showing the principle of correcting the color temperature without reducing the brightness in the display re-imaging system according to the present invention which is illustrated in FIG. 2.

The light which is emitted from the LCD monitor 10 consists of R (red), G (green) and B (blue) components. The light emitted from the LCD monitor 10 before the color temperature correction according to the present invention is performed contains 100% of each of the three colors as indicated by "normal" in FIG. 3.

The case of reducing the color temperature of the LCD monitor 10, for instance, to match with the color temperature of the studio is now considered. As mentioned earlier, the conventional methods for color temperature correction include:

1) the RGB adjustment method (which controls RGB gains by adjusting the level of the image signal applied to the LCD driver circuit 20); and 2) the filter adjustment method (which places an optical filter in front of the LCD monitor 10 for color temperature correction).

The lowering the color temperature of the LCD monitor 10 by the RGB adjustment method essentially reduces the G and B components of the light emitted from the LCD monitor 10.

Suppose the case where the G and B components of the light emitted from the LCD monitor 10 are reduced relative to the R component. Regarding the light emitted from the LCD monitor 10, the R component is retained 100% as indicated by the "RGB adjustment method" in FIG. 3, but the G and B components are both reduced. In this case, because the LCD monitor 10 has a lower brightness saturation point than a CRT monitor, it is not possible to regain the balance by increasing the overall brightness after color temperature correction as is the case with a CRT monitor. As a result, if the RGB adjustment method is selected, the overall brightness of the light emitted from the LCD monitor 10 diminishes.

The color temperature correction based on the filter adjustment method for lowering the color temperature of the LCD monitor 10 also essentially reduces the G and B components of the light emitted from the LCD monitor 10.

In the case of the filter adjustment method, because the color temperature correction is accomplished by placing an optical filter in front of the LCD monitor 10, the R component which is not required to be reduced is also reduced as indicated by the "filter adjustment method" in FIG. 3. As a result, the overall brightness of the light emitted from the LCD monitor 10 diminishes.

On the other hand, according to the color temperature correction method of the present invention, the color temperature correction is conducted at the stage of the cold cathode fluorescent lamps 11-1 to 11-4 which form the back light for the LCD monitor 10 so that the LCD monitor 10 can be operated at the 100% of the brightness saturation point before color-temperature correction.

The breakdown of the R, G and B components of the light emitted from the LCD monitor 10 when the color temperature correction method of the present invention is applied is indicated by the "method of the present invention" in FIG. 3. As can be appreciated from FIG. 3, according to the method of the present invention, because the color temperature correction is conducted at the stage of the back light according to the "method of the present invention", the LCD monitor 10 can make 100% of the brightness saturation point available, and the R, G and B components are delivered 100%. As a result, the color temperature correction of the LCD monitor 10 is made possible without diminishing the brightness of the LCD monitor 10 so that the display of the monitor for display re-imaging can be avoided from becoming pale while ensuring a bright and natural re-imaged image when this LCD monitor 10 is used as the monitor for display re-imaging.

Figure 4:
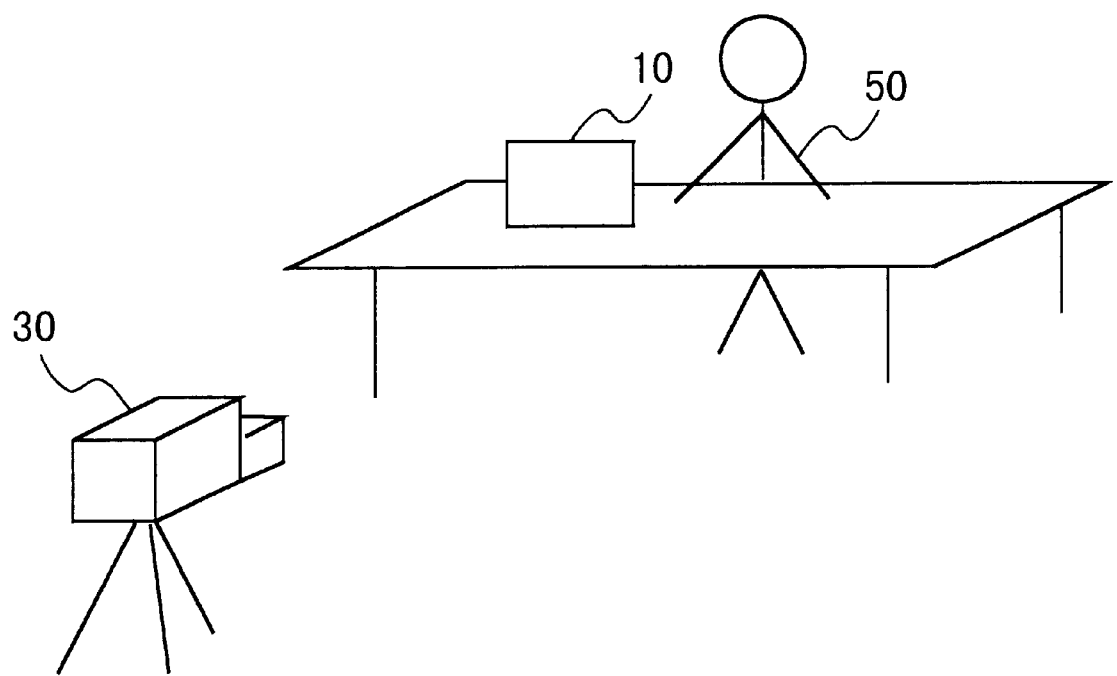
FIG. 4 is a view showing the mode of operation of the re-imaging system according to the present invention shown in FIG. 2.

FIG. 4 is a diagram showing an exemplary mode of operation of the display re-imaging according to the present invention shown in FIG. 2. FIG. 4 illustrates a situation where a newscaster 50 reports news by using an LCD monitor 10 during a news program. In this case, the television camera 30 for shooting the scene captures the display of the LCD monitor 10 as well as the newscaster 50, and the re-imaging which is the subject matter of the present invention takes place.

In the LCD monitor 10 which is used in this situation, 1) the color temperature of the cold cathode fluorescent lamps 11-1 to 11-4 is matched with that of the studio by suitably selecting the material of the fluorescent layer deposited on the inner surfaces of the glass tubes of the cold cathode fluorescent lamps 11-1 to 11-4 which form the back light; and 2) a reflective polarizing film 12 serving as brightness adjusting means is placed in front of the cold cathode fluorescent lamps 11-1 to 11-4 which form the back light.

Figure 5:
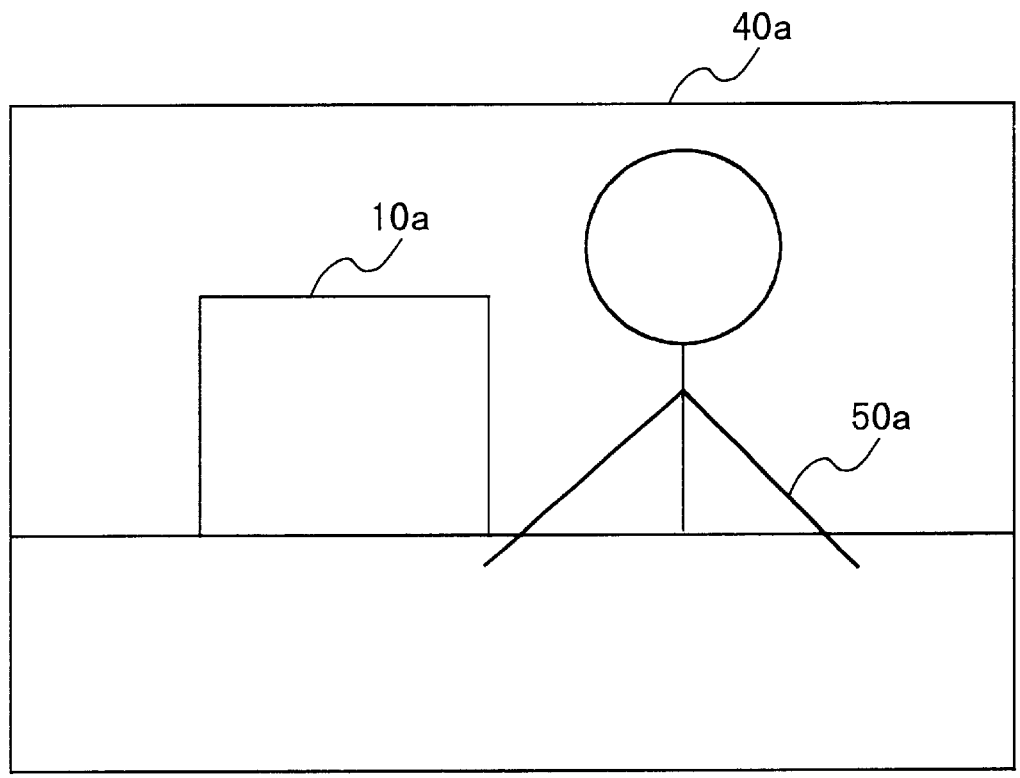
FIG. 5 is a view showing an exemplary image short by the television camera 30 in the example shown in FIG. 4.

FIG. 5 shows an exemplary image which is shot by the television camera 30 in the situation shown in FIG. 4. The image captured by the television camera 30 in the situation shown in FIG. 4 is shown, for instance, on the television set 40 shown in FIG. 2 which is connected to the television camera 30. The display 40a in FIG. 5 is an example of the display on the television set 40.

In this case, the display 40a includes the image 10a which is re-imaged from the display of the LCD monitor 10 as well as the image 50a of the newscaster 50. The image 10a or the re-imaged display image of the LCD monitor 10 is free from unnatural paleness because the color temperature of the LCD monitor 10 is corrected to that of the studio.

In this LCD monitor 10, because the color temperature correction is conducted at the stage of the back light, and the reflective polarizing film serving as brightness adjusting means in placed in front of the back light, in spite of the color temperature correction, the display of the LCD monitor 10 retains an adequate brightness, and the image 10a obtained from the re-imaging of the LCD monitor 10 can be displayed as the display 40a of the television set 40 with an adequate brightness.

Under the condition of the color temperature of 3,050 K and the luminance of 1,200 lux in the studio, an identical image signal (color bars) is supplied to a conventional LCD monitor and a LCD monitor according to the present invention. The white peak is shot by a studio camera, and the obtained image signal is measured by a wave monitor. The display of the conventional LCD monitor was reduced by 55% in brightness, but the display of the LCD monitor according to the present invention retained 90% of the original brightness. In short, it was confirmed that the present invention can achieve an improvement of about 160% over the prior art.

In the above described embodiment, the monitor for display re-imaging according to the present invention was applied to the LCD monitor, but the monitor for display re-imaging according to the present invention is not limited to the LCD monitor but is equally applicable to LCD projectors and other devices using non-self-light-emitting display panels.

Figure 6:
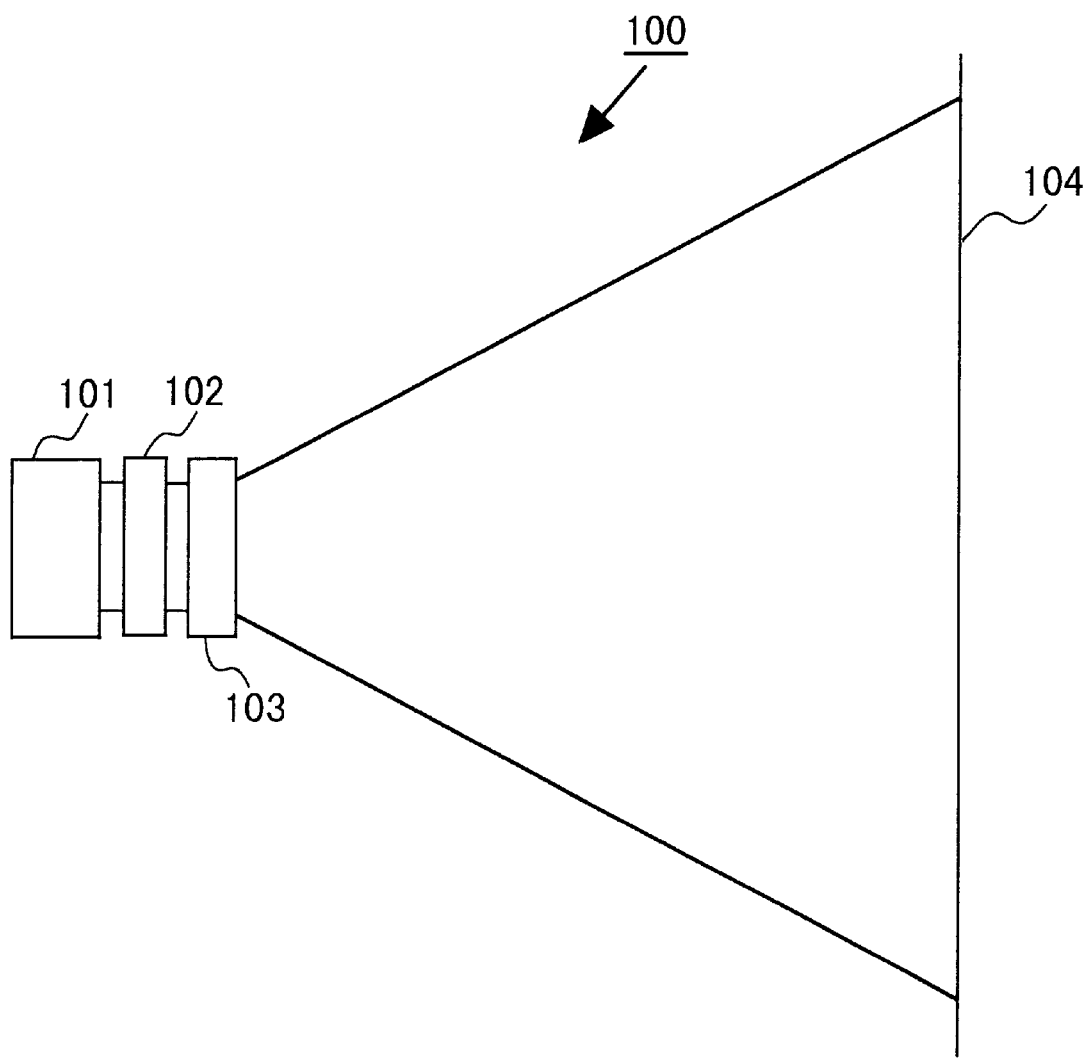
FIG. 6 is a side view showing another embodiment of the monitor for display re-imaging according to the present invention.

FIG. 6 is a side view of yet another embodiment of the monitor for display re-imaging according to the present invention. The monitor for display re-imaging shown in FIG. 6 is applied to an LCD projector 100.

In FIG. 6, the LCD projector 100 comprises a light source 101, an LCD shutter 102, an optical system for enlargement 103, and a screen 104. The LCD shutter 102 can be opened and closed according to a desired image signal which is supplied from outside so that the image corresponding to the desired image signal may be projected onto a screen 104 by using the light generated from the light source 101.

In the LCD projector 100 having the above described structure, the light source 101 is color temperature corrected so as to match the surrounding color temperature.

According to this structure, even though the color temperature correction is made, the brightness saturation point is retained 100%, and the R, G and B components are all controlled at the 100% level. Therefore, the color temperature correction of the LCD projector is enabled without reducing the brightness.

Therefore, when this LCD projector 100 is used as a monitor for display re-imaging, the display of this monitor would not turn pale, and the brightness is adequately ensured, and a natural re-imaged image can be obtained.

INDUSTRIAL APPLICABILITY

As can be appreciated from the foregoing description, according to the present invention, in a monitor for display re-imaging such as LCD monitors using non-self-light-emitting display panels which display an image by controlling light emitted from a light source, because the color temperature of the light source is corrected so as to match the surrounding color temperature, the display of the monitor for display re-imaging would not turn pale, and a re-imaged image which is both natural and highly bright can be obtained. Therefore, the application of monitors for display re-imaging using non-self-light-emitting display panels such as LCD monitors can be substantially expanded.

What is claimed is:

1. A monitor for display re-imaging, comprising a back light including a prescribed light source, and a liquid crystal display panel for selectively transmitting light emitted from the back light according to an image signal, characterized by that:

a color temperature of the light source forming the back light is matched with a color temperature of a re-imaging environment;

wherein the monitor is operated at a brightness saturation point before the matching of the color temperatures, and the monitor is operated at 100% of the brightness saturation point after the matching of the color temperatures;

wherein, where each of R, G, and B components of light emitted through the liquid crystal display panel before the color temperature correction is at 100%, each of the R, G, and B components of light emitted through the liquid crystal display panel after the color temperature correction is also at 100%.

2. A monitor for display re-imaging according to claim 1, wherein the re-imaging environment consists of a television studio, and the color temperature of the light source forming the back light corresponds to the color temperature of a reddish color.

3. A monitor for display re-imaging according to claim 1, wherein the monitor is formed as a LCD projector.

4. A monitor for display re-imaging according to claim 1, wherein the back light comprises a cold cathode fluorescent lamp.

5. A monitor for display re-imaging according to claim 1, wherein a reflective polarizing filter is placed in front of the back light.

6. A display re-imaging system, consisting of a monitor for display re-imaging and a video camera having a display of the monitor for display re-imaging in a part of a field of view of the video camera, wherein:

the monitor for display re-imaging comprises a back light including a prescribed light source, and a liquid crystal display panel for selectively transmitting light emitted from the back light, according to an image signal, a color temperature of the light source forming the back light being matched with a color temperature of a re-imaging environment;

wherein the monitor is operated at a brightness saturation point before the matching of the color temperatures, and the monitor is operated at 100% of the-brightness saturation point after the matching of the color temperatures;

wherein, where each of R, G, and B components of light emitted through the liquid crystal display panel before the color temperature correction is at 100%, each of the R, G, and B components of light emitted through the liquid crystal-display panel after the color temperature correction is also at 100%.

7. A display re-imaging system according to claim 6, wherein the re-imaging environment consists of a television studio, and the color temperature of the light source forming the back light corresponds to the color temperature of a reddish color.

8. A display re-imaging system according to claim 6, wherein the monitor is formed as a LCD projector.

9. A display re-imaging system according to claim 6, wherein the back light comprises a cold cathode fluorescent lamp.

10. A display re-imaging system according to claim 6, wherein a reflective polarizing filter is placed in front of the back light.

* * * * *